(12) United States Patent
Mizuno et al.

(10) Patent No.: US 6,620,754 B2
(45) Date of Patent: Sep. 16, 2003

(54) DIELECTRIC CERAMIC COMPOSITION AND CERAMIC CAPACITOR

(75) Inventors: Youichi Mizuno, Tokyo (JP); Hisamitsu Shizuno, Tokyo (JP); Kenji Saito, Tokyo (JP); Yasunobu Kawamoto, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 250 days.

(21) Appl. No.: 09/893,701

(22) Filed: Jun. 29, 2001

(65) Prior Publication Data

US 2002/0016247 A1 Feb. 7, 2002

(30) Foreign Application Priority Data

Jun. 30, 2000 (JP) ........................................ 2000-198046

(51) Int. Cl.⁷ ............................................. C04B 35/468
(52) U.S. Cl. ...................... 501/138; 501/139; 501/32; 361/321.4; 361/321.5
(58) Field of Search ..................... 501/32, 138, 139; 361/321.4, 321.5

(56) References Cited

U.S. PATENT DOCUMENTS 5,742,473 A * 4/1998 Sano et al. ............ 361/321.14
6,437,969 B2 * 8/2002 Mizuno et al. ............. 361/311
6,510,039 B1 * 1/2003 Morita et al. ............ 361/321.2

* cited by examiner

*Primary Examiner*—David Brunsman
(74) *Attorney, Agent, or Firm*—Bacon & Thomas, PLLC

(57) ABSTRACT

The ceramic capacitor in accordance with the present invention is fabricated by employing a dielectric ceramic composition in forming dielectric layers thereof, wherein the dielectric ceramic composition contains an oxide of Ba and Ti, an oxide of Re (Re used herein represents one or more rare-earth elements selected from Sm, Eu, Gd, Tb, Dy, Ho, Er, Tm, Tb and Y), an oxide of Mg, one or more oxides selected from oxides of Mn, V and Cr, an oxide of Mo and/or W and $SiO_2$ or a glass component including $SiO_2$, wherein the amount of the oxide of Ba and Ti is 100 mol % in terms of $BaTiO_3$, the amount of the oxide of Re is 0.25 to 1.5 mol % in terms of $Re_2O_3$, the amount of the oxide of Mg is 0.2 to 1.5 mol % in terms of MgO and the amount of one or more oxides of Mn, V or Cr is 0.03 to 0.6 mol % in terms of $Mn_2O_3$, $V_2O_5$, $Cr_2O_3$, respectively, and the amount of the oxide of Mo and/or W is 0.025 to 0.25 mol % in terms of $MoO_3$ and $WO_3$.

14 Claims, 3 Drawing Sheets

DIELECTRIC CERAMIC COMPOSITION AND CERAMIC CAPACITOR

FIELD OF THE INVENTION

The present invention relates to a ceramic capacitor and ceramic compositions therefor; and, more particularly, to reduction resistive dielectric ceramic compositions suitable for use as a dielectric layer of a ceramic capacitor having internal electrodes made of a base metal such as Ni and a ceramic capacitor fabricated by employing such ceramic compositions as a dielectric layer thereof.

BACKGROUND OF THE INVENTION

Recently, a base metal, e.g., Ni, is widely used in forming internal electrodes of multilayer ceramic capacitors for the purpose of reducing manufacturing costs. In case the internal electrodes are composed of the base metal, it is required that chip-shaped laminated bodies including therein the internal electrodes be sintered in a reductive atmosphere in order to prevent an oxidization of the internal electrodes. Accordingly, a variety of reduction resistive dielectric ceramic compositions have been developed.

Recent trend towards ever more miniaturized and dense electric circuits intensifies a demand for a further scaled down multilayer ceramic capacitor with higher capacitance. Keeping up with such demand, there has been made an effort to fabricate thinner dielectric layers and to stack a greater number of the thus produced dielectric layers.

However, when the dielectric layers are thinned out, a voltage applied to a unit thickness intrinsically increases. Accordingly, the operating life of the dielectric layers is shortened and thus a reliability of the multilayer ceramic capacitor is also deteriorated.

SUMMARY OF THE INVENTION

It is, therefore, an object of the present invention to provide highly reliable dielectric ceramic compositions and ceramic capacitors prepared by employing such dielectric ceramic compositions in forming dielectric layers thereof, wherein the dielectric ceramic compositions exhibit such electrical characteristics as a dielectric constant equal to or greater than 3000, a capacitance variation of −15% to +15% (based on a capacitance obtained at a temperature of +25° C.) in the temperature range from −55° C. to +125° C., a dielectric loss "tan δ" of 3.5% or less and an accelerated life of 200,000 seconds or greater.

In accordance with of the present invention, there is provided a dielectric ceramic composition comprising: 100 mol % of an oxide of Ba and Ti; 0.25 to 1.5 mol % of an oxide of Re, Re representing one or more elements selected from the group consisting of Sm, Eu, Gd, Tb, Dy, Ho, Er, Tm, Yb and Y; 0.2 to 1.5 mol % of an oxide of Mg; 0.03 to 0.6 mol % of oxides of one or more elements selected from the group consisting of Mn, V and Cr; 0.025 to 0.25 mol % of oxides of one or two elements of Mo and W; and a glass component including $SiO_2$.

BRIEF DESCRIPTION OF THE DRAWINGS

The above and other objects and features of the present invention will become apparent from the following description of a preferred embodiment given in conjunction with the accompanying drawings, in which.

DETAILED DESCRIPTION OF THE PREFERRED EMBODIMENTS

Figure 1:
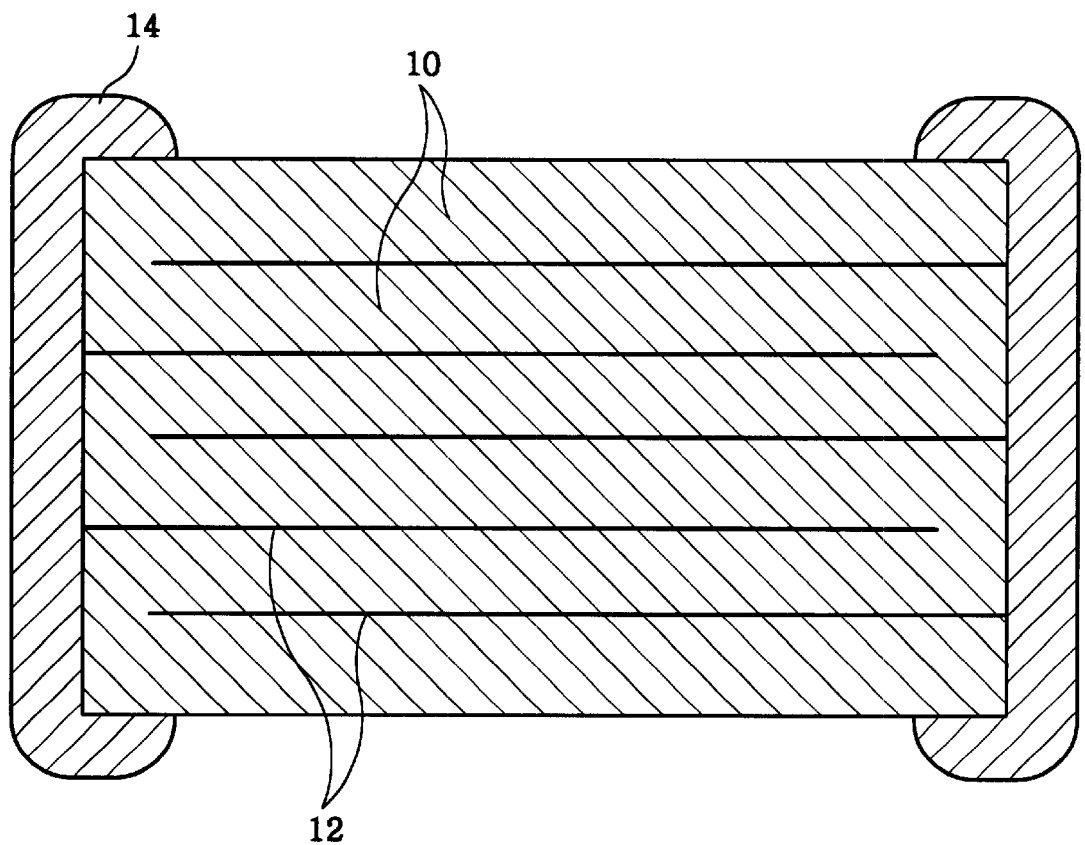
FIG. 1 represents a schematic cross sectional view illustrating a multilayer ceramic capacitor.

Compound powders of $BaCO_3$, $TiO_2$, $Re_2O_3$, MgO, $Mn_2O_3$, $V_2O_5$, $Cr_2O_3$, $Fe_2O_3$, NiO, CuO, $MoO_3$, $WO_3$ and a glass component including $SiO_2$ were weighed in amounts as specified in the accompanying Tables 1-1 and 1-6 and mixed for about 20 hours by a wet method in a ball mill containing therein PSZ (partially sterilized zirconia) balls and water to thereby obtain a ceramic slurry. The produced ceramic slurry was dehydrated and then dried by being heated at about 200° C. for 5 hours.

TABLE 1-1

| Sample Number | Rare-earth ($Re_2O_3$) Element | Rare-earth ($Re_2O_3$) Content | MgO | $Mn_2O_3$ | $V_2O_5$ | $Cr_2O_3$ | Total Content | $MoO_3$ | $Li_2O$ |
|---|---|---|---|---|---|---|---|---|---|
| 1✗ | Ho | 1.0 | 0.6 | 0.02 | — | — | 0.02 | 0.1 | 0.1 |
| 2✗ | Ho | 1.0 | 0.6 | — | 0.02 | — | 0.02 | 0.1 | 0.1 |
| 3✗ | Ho | 1.0 | 0.6 | — | — | 0.02 | 0.02 | 0.1 | 0.1 |
| 4 | Ho | 1.0 | 0.6 | 0.03 | — | — | 0.03 | 0.1 | 0.1 |
| 5 | Ho | 1.0 | 0.6 | — | 0.03 | — | 0.03 | 0.1 | 0.1 |
| 6 | Ho | 1.0 | 0.6 | — | — | 0.03 | 0.03 | 0.1 | 0.1 |
| 7 | Ho | 1.0 | 0.6 | 0.01 | 0.02 | — | 0.03 | 0.1 | 0.1 |
| 8 | Ho | 1.0 | 0.6 | 0.05 | 0.02 | — | 0.07 | 0.1 | 0.1 |
| 9 | Ho | 1.0 | 0.6 | 0.05 | — | 0.1 | 0.15 | 0.1 | 0.1 |
| 10 | Ho | 1.0 | 0.6 | 0.05 | 0.01 | 0.1 | 0.16 | 0.1 | 0.1 |
| 11 | Ho | 1.0 | 0.6 | 0.1 | 0.05 | 0.1 | 0.25 | 0.1 | 0.1 |
| 12 | Ho | 1.0 | 0.6 | 0.1 | 0.1 | 0.1 | 0.3 | 0.1 | 0.1 |
| 13 | Ho | 1.0 | 0.6 | 0.3 | — | — | 0.3 | 0.1 | 0.1 |
| 14 | Ho | 1.0 | 0.6 | — | — | 0.3 | 0.3 | 0.1 | 0.1 |
| 15 | Ho | 1.0 | 0.6 | — | 0.3 | — | 0.3 | 0.1 | 0.1 |
| 16 | Ho | 1.0 | 0.6 | 0.6 | — | — | 0.6 | 0.1 | 0.1 |
| 17 | Ho | 1.0 | 0.6 | — | — | 0.6 | 0.6 | 0.1 | 0.1 |
| 18 | Ho | 1.0 | 0.6 | — | — | 0.6 | 0.6 | 0.1 | 0.1 |
| 19 | Ho | 1.0 | 0.6 | 0.3 | 0.3 | — | 0.6 | 0.1 | 0.1 |

TABLE 1-1-continued

| Sample Number | Rare-earth (Re₂O₃) Element | Rare-earth (Re₂O₃) Content | MgO | Mn₂O₃ | V₂O₅ | Cr₂O₃ | Total Content | MoO₃ | ※Li₂O— |
|---|---|---|---|---|---|---|---|---|---|
| 20 | Ho | 1.0 | 0.6 | 0.3 | — | 0.3 | 0.6 | 0.1 | 0.1 |
| 21 | Ho | 1.0 | 0.6 | — | 0.3 | 0.3 | 0.6 | 0.1 | 0.1 |
| 22 | Ho | 1.0 | 0.6 | 0.2 | — | 0.4 | 0.6 | 0.1 | 0.1 |
| 23 | Ho | 1.0 | 0.6 | 0.1 | — | 0.5 | 0.6 | 0.1 | 0.1 |
| 24 | Ho | 1.0 | 0.6 | 0.2 | 0.2 | 0.2 | 0.6 | 0.1 | 0.1 |
| 25※ | Ho | 1.0 | 0.6 | 0.7 | — | — | 0.7 | 0.1 | 0.1 |
| 26※ | Ho | 1.0 | 0.6 | — | 0.7 | — | 0.7 | 0.1 | 0.1 |
| 27※ | Ho | 1.0 | 0.6 | — | — | 0.7 | 0.7 | 0.1 | 0.1 |
| 28 | Ho | 1.0 | 0.6 | 0.2 | 0.1 | 0.4 | 0.7 | 0.1 | 0.1 |
| 29※ | Ho | 1.0 | 0.6 | 0.05 | 0.1 | 0.1 | 0.25 | 0 | 0.1 |

※Li₂O—: Li₂O—BaO—TiO₂—SiO₂ (unit: wt %)

TABLE 1-2

| Sample Number | Rare-earth (Re₂O₃) Element | Rare-earth (Re₂O₃) Content | MgO | Mn₂O₃ | V₂O₅ | Cr₂O₃ | Total Content | MoO₃ | ※Li₂O— |
|---|---|---|---|---|---|---|---|---|---|
| 30 | Ho | 1.0 | 0.6 | 0.05 | 0.1 | 0.1 | 0.25 | 0.025 | 0.1 |
| 31 | Ho | 1.0 | 0.6 | 0.05 | 0.1 | 0.1 | 0.25 | 0.05 | 0.1 |
| 32 | Ho | 1.0 | 0.6 | 0.05 | 0.1 | 0.1 | 0.25 | 0.1 | 0.1 |
| 33 | Ho | 1.0 | 0.6 | 0.05 | 0.1 | 0.1 | 0.25 | 0.2 | 0.1 |
| 34※ | Ho | 1.0 | 0.6 | 0.05 | 0.1 | 0.1 | 0.25 | 0.3 | 0.1 |
| 35 | Ho | 1.0 | 0.6 | 0.15 | 0.05 | — | 0.2 | 0.1 | 0.1 |
| 36※ | Ho | 0 | 0.6 | 0.15 | 0.05 | — | 0.2 | 0.1 | 0.1 |
| 37 | Ho | 0.25 | 0.6 | 0.15 | 0.05 | — | 0.2 | 0.1 | 0.1 |
| 38 | Ho | 0.5 | 0.6 | 0.15 | 0.05 | — | 0.2 | 0.1 | 0.1 |
| 39 | Ho | 1.0 | 0.6 | 0.15 | 0.05 | — | 0.2 | 0.1 | 0.1 |
| 40 | Ho | 1.5 | 0.6 | 0.15 | 0.05 | — | 0.2 | 0.1 | 0.1 |
| 41※ | Ho | 2.0 | 0.6 | 0.15 | 0.05 | — | 0.2 | 0.1 | 0.1 |
| 42※ | Ho | 4.0 | 0.6 | 0.15 | 0.05 | — | 0.2 | 0.1 | 0.1 |
| 43 | Sm | 0.25 | 0.8 | 0.15 | 0.05 | — | 0.2 | 0.1 | 0.1 |
| 44 | Sm | 0.75 | 0.8 | 0.15 | 0.05 | — | 0.2 | 0.1 | 0.1 |
| 45 | Eu | 0.75 | 0.8 | 0.15 | 0.05 | — | 0.2 | 0.1 | 0.1 |
| 46 | Gd | 0.75 | 0.8 | 0.15 | 0.05 | — | 0.2 | 0.1 | 0.1 |
| 47 | Tb | 0.75 | 0.8 | 0.15 | 0.05 | — | 0.2 | 0.1 | 0.1 |
| 48 | Dy | 0.75 | 0.8 | 0.15 | 0.05 | — | 0.2 | 0.1 | 0.1 |
| 49 | Er | 0.75 | 0.4 | 0.15 | 0.05 | — | 0.2 | 0.1 | 0.1 |
| 50 | Tm | 0.75 | 0.4 | 0.15 | 0.05 | — | 0.2 | 0.1 | 0.1 |
| 51 | Yb | 0.75 | 0.4 | 0.15 | 0.05 | — | 0.2 | 0.1 | 0.1 |
| 52 | Yb | 1.0 | 0.4 | 0.15 | 0.05 | — | 0.2 | 0.1 | 0.1 |
| 53 | Y | 1.0 | 0.4 | 0.15 | 0.05 | — | 0.2 | 0.1 | 0.1 |
| 54 | Ho/Dy | 0.5/0.5 | 0.6 | 0.15 | 0.05 | — | 0.2 | 0.1 | 0.1 |
| 55 | Ho/Dy/Yb | 0.5/0.5/0.5 | 0.6 | 0.15 | 0.05 | — | 0.2 | 0.1 | 0.1 |
| 56 | Sm/Ho/Yb | 0.2/0.5/0.1 | 0.6 | 0.15 | 0.05 | — | 0.2 | 0.1 | 0.1 |
| 57 | Sm/Yb | 0.5/1.0 | 0.6 | 0.15 | 0.05 | — | 0.2 | 0.1 | 0.1 |
| 58※ | Ho | 1 | 0 | 0.15 | 0.05 | — | 0.2 | 0.1 | 0.1 |

※Li₂O—: Li₂O—BaO—TiO₂—SiO₂ (unit: wt %)

TABLE 1-3

| Sample No | RE (Re₂O₃) Elmt | RE (Re₂O₃) Cnt | MgO | Mn₂O | V₂O | Cr₂O₃ | Total Content | MoO₃ | ※Li₂O— | B₂O₃—MO—SiO₂ M | B₂O₃—MO—SiO₂ B₂O₃ | B₂O₃—MO—SiO₂ SiO₂ | B₂O₃—MO—SiO₂ Mo | Total Content |
|---|---|---|---|---|---|---|---|---|---|---|---|---|---|---|
| 59 | Ho | 1.0 | 0.2 | 0.15 | 0.05 | — | 0.2 | 0.1 | 0.1 | — | — | — | — | — |
| 60 | Ho | 1.0 | 1.5 | 0.15 | 0.05 | — | 0.2 | 0.1 | 0.1 | — | — | — | — | — |
| 61※ | Ho | 1.0 | 2.0 | 0.15 | 0.05 | — | 0.2 | 0.1 | 0.1 | — | — | — | — | — |
| 62※ | Ho | 1.0 | 0.6 | 0.15 | 0.05 | — | 0.2 | 0.1 | 0 | — | — | — | — | — |
| 63 | Ho | 1.0 | 0.6 | 0.15 | 0.05 | — | 0.2 | 0.1 | 0.05 | — | — | — | — | — |
| 64 | Ho | 1.0 | 0.6 | 0.15 | 0.05 | — | 0.2 | 0.1 | 0.5 | — | — | — | — | — |
| 65 | Ho | 1.0 | 0.6 | 0.15 | 0.05 | — | 0.2 | 0.1 | 1.0 | — | — | — | — | — |
| 66※ | Ho | 1.0 | 0.6 | 0.15 | 0.05 | — | 0.2 | 0.1 | 2.0 | — | — | — | — | — |
| 67※ | Ho | 1.0 | 0.5 | 0.15 | 0.05 | 0.2 | 0.4 | 0.05 | — | Ca | 15 | 65 | 20 | 0 |
| 68 | Ho | 1.0 | 0.5 | 0.15 | 0.05 | 0.2 | 0.4 | 0.05 | — | Ca | 15 | 65 | 20 | 0.05 |
| 69 | Ho | 1.0 | 0.5 | 0.15 | 0.05 | 0.2 | 0.4 | 0.05 | — | Ca | 15 | 65 | 20 | 2.00 |
| 70 | Ho | 1.0 | 0.5 | 0.15 | 0.05 | 0.2 | 0.4 | 0.05 | — | Ca | 15 | 65 | 20 | 5.00 |

TABLE 1-3-continued

| Sample No | RE (Re₂O₃) Elmt | Cnt | MgO | Mn₂O | V₂O | Cr₂O₃ | Total Content | MoO₃ | ✕Li₂O— | B₂O₃—MO—SiO₂ M | B₂O₃ | SiO₂ | Mo | Total Content |
|---|---|---|---|---|---|---|---|---|---|---|---|---|---|---|
| 71✕ | Ho | 1.0 | 0.5 | 0.15 | 0.05 | 0.2 | 0.4 | 0.05 | — | Ca | 15 | 65 | 20 | 10.00 |
| 72✕ | Ho | 1.0 | 0.5 | 0.15 | 0.05 | 0.2 | 0.4 | 0.05 | — | Ca | 95 | 4 | 1 | 1.00 |
| 73 | Ho | 1.0 | 0.5 | 0.15 | 0.05 | 0.2 | 0.4 | 0.05 | — | Ca | 90 | 9 | 1 | 1.00 |
| 74 | Ho | 1.0 | 0.5 | 0.15 | 0.05 | 0.2 | 0.4 | 0.05 | — | Ca | 90 | 1 | 9 | 1.00 |
| 75✕ | Ho | 1.0 | 0.5 | 0.15 | 0.05 | 0.2 | 0.4 | 0.05 | — | Ca | 50 | 50 | 0 | 1.00 |
| 76 | Ho | 1.0 | 0.5 | 0.15 | 0.05 | 0.2 | 0.4 | 0.05 | — | Ca | 20 | 70 | 10 | 1.00 |
| 77 | Ho | 1.0 | 0.5 | 0.15 | 0.05 | 0.2 | 0.4 | 0.05 | — | Ca | 19 | 80 | 1 | 1.00 |
| 78 | Ho | 1.0 | 0.5 | 0.15 | 0.05 | 0.2 | 0.4 | 0.05 | — | Ca | 1 | 80 | 19 | 1.00 |
| 79✕ | Ho | 1.0 | 0.5 | 0.15 | 0.05 | 0.2 | 0.4 | 0.05 | — | Ca | 4 | 95 | 1 | 1.00 |
| 80 | Ho | 1.0 | 0.5 | 0.15 | 0.05 | 0.2 | 0.4 | 0.05 | — | Ca | 1 | 39 | 60 | 1.00 |
| 81 | Ho | 1.0 | 0.5 | 0.15 | 0.05 | 0.2 | 0.4 | 0.05 | — | Ca | 29 | 1 | 70 | 1.00 |
| 82✕ | Ho | 1.0 | 0.5 | 0.15 | 0.05 | 0.2 | 0.4 | 0.05 | — | Ca | 4 | 5 | 95 | 1.00 |
| 83 | Ho | 1.0 | 0.5 | 0.15 | 0.05 | 0.2 | 0.4 | 0.05 | — | Ca | 20 | 30 | 50 | 1.00 |

✕Li₂O—: Li₂O—BaO—TiO₂—SiO₂ (unit: wt %)

TABLE 1-4

| Sample No. | RE (Re₂O₃) Elmt | Cnt | MgO | Mn₂O₃ | V₂O₅ | Cr₂O₃ | α | Ttl Cnt | MoO₃ | WO₃ | Ttl Cnt | B₂O₃—MO—SiO₂ M | B₂O₃ | SiO₂ | Mo | Ttl Cnt |
|---|---|---|---|---|---|---|---|---|---|---|---|---|---|---|---|---|
| 84✕ | Ho | 1.0 | 0.6 | 0.02 | — | — | 0.01 | 0.03 | 0.05 | 0.05 | 0.1 | Ba | 15 | 65 | 20 | 1.00 |
| 85✕ | Ho | 1.0 | 0.6 | — | 0.02 | — | 0.01 | 0.03 | 0.05 | 0.05 | 0.1 | Ba | 15 | 65 | 20 | 1.00 |
| 86✕ | Ho | 1.0 | 0.6 | — | — | 0.02 | 0.01 | 0.03 | 0.05 | 0.05 | 0.1 | Ba | 15 | 65 | 20 | 1.00 |
| 87 | Ho | 1.0 | 0.6 | 0.03 | — | — | 0.01 | 0.04 | 0.05 | 0.05 | 0.1 | Ca | 15 | 65 | 20 | 1.00 |
| 88 | Ho | 1.0 | 0.6 | — | 0.03 | — | 0.01 | 0.04 | 0.05 | 0.05 | 0.1 | Ca | 15 | 65 | 20 | 1.00 |
| 89 | Ho | 1.0 | 0.6 | — | — | 0.03 | 0.01 | 0.04 | 0.05 | 0.05 | 0.1 | Ca | 15 | 65 | 20 | 1.00 |
| 90 | Ho | 1.0 | 0.6 | 0.01 | 0.02 | — | 0.01 | 0.04 | 0.05 | 0.05 | 0.1 | Sr | 15 | 65 | 20 | 1.00 |
| 91 | Ho | 1.0 | 0.6 | 0.05 | 0.02 | — | 0.01 | 0.08 | 0.05 | 0.05 | 0.1 | Sr | 15 | 65 | 20 | 1.00 |
| 92 | Ho | 1.0 | 0.6 | 0.05 | — | 0.1 | 0.01 | 0.16 | 0.05 | 0.05 | 0.1 | Sr | 15 | 65 | 20 | 1.00 |
| 93 | Ho | 1.0 | 0.6 | 0.05 | 0.01 | 0.1 | 0.01 | 0.17 | 0.05 | 0.05 | 0.1 | Sr | 15 | 65 | 20 | 1.00 |
| 94 | Ho | 1.0 | 0.6 | 0.1 | 0.05 | 0.1 | 0.1 | 0.35 | 0.05 | 0.05 | 0.1 | Mg | 15 | 65 | 20 | 1.00 |
| 95 | Ho | 1.0 | 0.6 | 0.1 | 0.1 | 0.1 | 0.1 | 0.4 | 0.05 | 0.05 | 0.1 | Mg | 15 | 65 | 20 | 1.00 |
| 96 | Ho | 1.0 | 0.6 | 0.3 | — | — | 0.1 | 0.4 | 0.05 | 0.05 | 0.1 | Mg | 15 | 65 | 20 | 1.00 |
| 97 | Ho | 1.0 | 0.6 | — | 0.3 | — | 0.1 | 0.4 | 0.05 | 0.05 | 0.1 | Mg | 15 | 65 | 20 | 1.00 |
| 98 | Ho | 1.0 | 0.6 | — | — | 0.3 | 0.1 | 0.4 | 0.05 | 0.05 | 0.1 | Mg | 15 | 65 | 20 | 1.00 |
| 99 | Ho | 1.0 | 0.6 | 0.6 | — | — | 0.4 | 1 | 0.05 | 0.05 | 0.1 | Zn | 15 | 85 | 20 | 1.00 |
| 100 | Ho | 1.0 | 0.6 | — | 0.6 | — | 0.4 | 1 | 0.05 | 0.05 | 0.1 | Zn | 35 | 65 | 20 | 1.00 |
| 101 | Ho | 1.0 | 0.6 | — | — | 0.6 | 0.4 | 1 | 0.05 | 0.05 | 0.1 | Zn | 15 | 65 | 20 | 1.00 |
| 102 | Ho | 1.0 | 0.6 | 0.3 | 0.3 | — | 0.4 | 1 | 0.05 | 0.05 | 0.1 | Ba | 15 | 65 | 20 | 1.00 |
| 103 | Ho | 1.0 | 0.6 | 0.3 | — | 0.3 | 0.4 | 1 | 0.05 | 0.05 | 0.1 | Ba | 15 | 65 | 20 | 1.00 |
| 104 | Ho | 1.0 | 0.6 | — | 0.3 | 0.3 | 0.4 | 1 | 0.05 | 0.05 | 0.1 | Ba | 15 | 65 | 20 | 1.00 |
| 105 | Ho | 1.0 | 0.6 | 0.2 | — | 0.4 | 0.4 | 1 | 0.05 | 0.05 | 0.1 | Ba | 15 | 65 | 20 | 1.00 |
| 106 | Ho | 1.0 | 0.6 | 0.1 | — | 0.5 | 0.4 | 1 | 0.05 | 0.05 | 0.1 | Ba | 15 | 65 | 20 | 1.00 |
| 107 | Ho | 1.0 | 0.6 | 0.2 | 0.2 | 0.2 | 0.4 | 1 | 0.05 | 0.05 | 0.1 | Ba | 15 | 65 | 20 | 1.00 |
| 108✕ | Ho | 1.0 | 0.6 | 0.7 | — | — | 0.6 | 1.3 | 0.05 | 0.05 | 0.1 | Ba/Ca | 15 | 65 | 10/10 | 1.00 |
| 109✕ | Ho | 1.0 | 0.6 | — | 0.7 | — | 0.6 | 1.3 | 0.05 | 0.05 | 0.1 | Ba/Ca | 15 | 65 | 10/10 | 1.00 |
| 110✕ | Ho | 1.0 | 0.6 | — | — | 0.7 | 0.6 | 1.3 | 0.05 | 0.05 | 0.1 | Ba/Ca | 15 | 65 | 10/10 | 1.00 |

✕ α: FeO—NiO—CuO (unit: mol %)

TABLE 1-5

| Sample Number | Rare-earth (Re₂O₃) Element | Content | MgO | Mn₂O₃ | V₂O₅ | Cr₂O₃ | Total Content | MoO₃ | WO₃ | Total Content | ✕LiO— | SiO₂ |
|---|---|---|---|---|---|---|---|---|---|---|---|---|
| 111✕ | Ho | 1.0 | 0.6 | 0.15 | 0.05 | — | 0.2 | 0.05 | — | 0.05 | — | 0.0 |
| 112 | Ho | 1.0 | 0.6 | 0.15 | 0.05 | — | 0.2 | 0.05 | — | 0.05 | — | 0.2 |
| 113 | Ho | 1.0 | 0.6 | 0.15 | 0.05 | — | 0.2 | 0.05 | — | 0.05 | — | 1.0 |
| 114 | Ho | 1.0 | 0.6 | 0.15 | 0.05 | — | 0.2 | 0.05 | — | 0.05 | — | 4.0 |
| 115✕ | Ho | 1.0 | 0.6 | 0.15 | 0.05 | — | 0.2 | 0.05 | — | 0.05 | — | 5.0 |
| 116✕ | Ho | 1.0 | 0.6 | 0.05 | 0.1 | 0.1 | 0.25 | — | 0 | 0 | 0.1 | — |
| 117 | Ho | 1.0 | 0.6 | 0.05 | 0.1 | 0.1 | 0.25 | — | 0.025 | 0.025 | 0.1 | — |
| 118 | Ho | 1.0 | 0.6 | 0.05 | 0.1 | 0.1 | 0.25 | — | 0.05 | 0.05 | 0.1 | — |
| 119 | Ho | 1.0 | 0.6 | 0.05 | 0.1 | 0.1 | 0.25 | — | 0.1 | 0.1 | 0.1 | — |
| 120 | Ho | 1.0 | 0.6 | 0.05 | 0.1 | 0.1 | 0.25 | — | 0.2 | 0.2 | 0.1 | — |
| 121 | Ho | 1.0 | 0.6 | 0.05 | 0.1 | 0.1 | 0.25 | — | 0.3 | 0.3 | 0.1 | — |

TABLE 1-5-continued

| Sample Number | Rare-earth (Re₂O₃) Element | Content | MgO | Mn₂O₃ | V₂O₅ | Cr₂O₃ | Total Content | MoO₃ | WO₃ | Total Content | ※LiO— | SiO₂ |
|---|---|---|---|---|---|---|---|---|---|---|---|---|
| 122※ | Ho | 1.0 | 0.6 | 0.05 | 0.1 | 0.1 | 0.25 | — | 0.4 | 0.4 | 0.1 | — |
| 123※ | Ho | 1.0 | 0.6 | 0.05 | 0.1 | 0.1 | 0.25 | 0 | 0 | 0 | 0.1 | — |
| 124 | Ho | 1.0 | 0.6 | 0.05 | 0.1 | 0.1 | 0.25 | 0.01 | 0.01 | 0.025 | 0.1 | — |
| 125 | Ho | 1.0 | 0.6 | 0.05 | 0.1 | 0.1 | 0.25 | 0.02 | 0.02 | 0.04 | 0.1 | — |
| 126 | Ho | 1.0 | 0.6 | 0.05 | 0.1 | 0.1 | 0.25 | 0 | 0.05 | 0.05 | 0.1 | — |
| 127 | Ho | 1.0 | 0.6 | 0.05 | 0.1 | 0.1 | 0.25 | 0.025 | 0.05 | 0.075 | 0.1 | — |
| 128 | Ho | 1.0 | 0.6 | 0.05 | 0.1 | 0.1 | 0.25 | 0.05 | 0.05 | 0.1 | 0.1 | — |
| 129 | Ho | 1.0 | 0.6 | 0.05 | 0.1 | 0.1 | 0.25 | 0.1 | 0.05 | 0.15 | 0.1 | — |
| 130 | Ho | 1.0 | 0.6 | 0.05 | 0.1 | 0.1 | 0.25 | 0.2 | 0.05 | 0.25 | 0.1 | — |
| 131※ | Ho | 1.0 | 0.6 | 0.05 | 0.1 | 0.1 | 0.25 | 0.3 | 0.05 | 0.35 | 0.1 | — |
| 132 | Ho | 1.0 | 0.6 | 0.05 | 0.1 | 0.1 | 0.25 | 0.05 | 0 | 0.05 | 0.1 | — |
| 133 | Ho | 1.0 | 0.6 | 0.05 | 0.1 | 0.1 | 0.25 | 0.05 | 0.025 | 0.075 | 0.1 | — |
| 134 | Ho | 1.0 | 0.6 | 0.05 | 0.1 | 0.1 | 0.25 | 0.05 | 0.05 | 0.1 | 0.1 | — |
| 135 | Ho | 1.0 | 0.6 | 0.05 | 0.1 | 0.1 | 0.25 | 0.05 | 0.1 | 0.15 | 0.1 | — |
| 136 | Ho | 1.0 | 0.6 | 0.05 | 0.1 | 0.1 | 0.25 | 0.05 | 0.2 | 0.25 | 0.1 | — |
| 137※ | Ho | 1.0 | 0.6 | 0.05 | 0.1 | 0.1 | 0.25 | 0.05 | 0.3 | 0.35 | 0.1 | — |

※Li₂O—: Li₂O—BaO—TiO₂—SiO₂ (unit wt %)

TABLE 1-6

| Sample No. | RE (Re₂O₃) Elmt | Cnt | MgO | Mn₂O₃ | V₂O₃ | α | Cnt | MoO₃ | WO₃ | Ttl Cnt | M | Li₂O—SiO₂—MO Li₂O | SiO₂ | Mo | Ttl Cnt |
|---|---|---|---|---|---|---|---|---|---|---|---|---|---|---|---|
| 138※ | Ho | 1.0 | 0.6 | 0.15 | 0.05 | 0.1 | 0.3 | 0.05 | 0.05 | 0.1 | Ca | 15 | 65 | 20 | 0 |
| 139 | Ho | 1.0 | 0.6 | 0.15 | 0.05 | 0.1 | 0.3 | 0.05 | 0.05 | 0.1 | Ca | 15 | 65 | 20 | 0.05 |
| 140 | Ho | 1.0 | 0.6 | 0.15 | 0.05 | 0.1 | 0.3 | 0.05 | 0.05 | 0.1 | Ca | 15 | 65 | 20 | 2 |
| 141 | Ho | 1.0 | 0.6 | 0.15 | 0.05 | 0.1 | 0.3 | 0.05 | 0.05 | 0.1 | Ca | 15 | 65 | 20 | 5 |
| 142※ | Ho | 1.0 | 0.6 | 0.15 | 0.05 | 0.1 | 0.3 | 0.05 | 0.05 | 0.1 | Ca | 15 | 65 | 20 | 10 |
| 143※ | Ho | 1.0 | 0.6 | 0.15 | 0.05 | 0.1 | 0.3 | 0.05 | 0.05 | 0.1 | Ca | 95 | 4 | 1 | 1 |
| 144 | Ho | 1.0 | 0.6 | 0.15 | 0.05 | 0.1 | 0.3 | 0.05 | 0.05 | 0.1 | Ca | 90 | 9 | 1 | 1 |
| 145 | Ho | 1.0 | 0.6 | 0.15 | 0.05 | 0.1 | 0.3 | 0.05 | 0.05 | 0.1 | Ca | 89 | 1 | 10 | 1 |
| 146※ | Ho | 1.0 | 0.6 | 0.15 | 0.05 | 0.1 | 0.3 | 0.05 | 0.05 | 0.1 | Ca | 50 | 50 | 0 | 1 |
| 147 | Ho | 1.0 | 0.6 | 0.15 | 0.05 | 0.1 | 0.3 | 0.05 | 0.05 | 0.1 | Ca | 20 | 70 | 10 | 1 |
| 148 | Ho | 1.0 | 0.6 | 0.15 | 0.05 | 0.1 | 0.3 | 0.05 | 0.05 | 0.1 | Ca | 5 | 94 | 1 | 1 |
| 149 | Ho | 1.0 | 0.6 | 0.15 | 0.05 | 0.1 | 0.3 | 0.05 | 0.05 | 0.1 | Ca | 1 | 94 | 5 | 1 |
| 150※ | Ho | 1.0 | 0.6 | 0.15 | 0.05 | 0.1 | 0.3 | 0.05 | 0.05 | 0.1 | Ca | 4 | 95 | 1 | 1 |
| 151 | Ho | 1.0 | 0.6 | 0.15 | 0.05 | 0.1 | 0.3 | 0.05 | 0.05 | 0.1 | Ca | 1 | 79 | 20 | 1 |
| 152 | Ho | 1.0 | 0.6 | 0.15 | 0.05 | 0.1 | 0.3 | 0.05 | 0.05 | 0.1 | Ca | 19 | 1 | 60 | 1 |
| 153※ | Ho | 1.0 | 0.6 | 0.15 | 0.05 | 0.1 | 0.3 | 0.05 | 0.05 | 0.1 | Ca | 4 | 5 | 95 | 1 |
| 154 | Ho | 1.0 | 0.6 | 0.15 | 0.05 | 0.1 | 0.3 | 0.05 | 0.05 | 0.1 | Ca | 20 | 30 | 50 | 1 |

※ α: FeO—NiO—CuO (unit: mol %)

Thereafter, the dried ceramic slurry was ground and then calcined in air at about 800° C. for 3 hours. The calcined slurry was then disaggregated by a wet method in a ball mill added with ethanol for about 10 hours. Next, the disaggregated ceramic slurry was dried by being heated at about 200° C. for 5 hours, thereby obtaining the powder of the calcined ceramic slurry.

In a following step, a dielectric ceramic slurry was obtained by mixing and grinding 1000 g (100 parts by weight) of the powder of the dielectric ceramic slurry, 15 wt % of an organic binder and 50 wt % of water in a ball mill, wherein the organic binder includes acrylic ester polymer, glycerin, and a solution of condensed phosphate.

Next, the dielectric slurry was subjected to a vacuum air separator to remove air bubbles therefrom and formed into a thin film coated on a polyester film by using a reverse roll coater. Thus produced ceramic thin film on the polyester film was heated and dried at about 100° C. and then diced to thereby obtain square ceramic green sheets having a thickness of about 5 μm and a size of about 10 cm×10 cm.

Meanwhile, 0.9 g of ethyl cellulose dissolved in 9.1 g of butyl carbitol and 10 g of Nickel powder having an average diameter of about 0.5 μm were loaded and stirred in a stirrer for 10 hours to form a conductive paste for use in forming internal electrodes of ceramic capacitors. Thereafter, the conductive paste was printed on the prepared ceramic green sheets to form conductive patterns thereon and then the printed conductive paste was dried.

Subsequently, ten ceramic green sheets having the conductive patterns thereon were stacked against each other with the conductive patterns facing upward, thereby forming a laminated body. Every two neighboring sheets were disposed in such a manner that the conductive patterns provided thereon were shifted by one half of a pattern size along the length direction. The laminated body also included one or more ceramic dummy sheets stacked against each of the uppermost and the lowermost ceramic green sheets having conductive patterns thereon, the ceramic dummy sheets representing ceramic green sheets without having conductive patterns thereon.

Next, the laminated body was pressed with a load of about 40 tons at about 50° C. along the stacking direction of the ceramic sheets in the laminated body. Afterwards, the pressed laminated body was diced into a multiplicity of chip shaped ceramic bodies having a size of about 3.2 mm×1.6 mm.

Thereafter, Ni external electrodes were formed at two opposite sides of each chip shaped ceramic body by, e.g., a dipping method, one end portion of each of the internal electrodes being exposed to one of the two opposite sides of each chip shaped ceramic body. Then, the chip shaped ceramic bodies were loaded into a furnace capable of controlling an atmosphere therein and the organic binder contained in the loaded ceramic bodies was removed by heating the furnace in an $N_2$ atmosphere. Then, the binder-removed chip shaped ceramic bodies were sintered at about 1300° C. in a non-oxidative atmosphere with oxygen partial pressure being in $10^{-5}$ to $10^{-8}$ atm order range. Thereafter, the sintered chip-shaped ceramic bodies were re-oxidized in an oxidative atmosphere to thereby obtain multilayer ceramic capacitors as shown in FIG. 1., wherein reference numerals 10, 12 and 14 represent dielectric layers, internal electrodes and external electrodes, respectively.

Tables 2-1 to 2-6 exhibit a measurement result of electrical characteristics obtained from the thus produced multilayer ceramic capacitors, wherein a thickness of each dielectric layer incorporated in the capacitors was about 3 $\mu$m.

The electrical characteristics of the multilayer ceramic capacitors were obtained as follows.

(A) Relative permittivity or dielectric constant $\epsilon_s$ was computed based on a facing area of a pair of neighboring internal electrodes, a thickness of a dielectric layer positioned between the pair of neighboring internal electrodes, and the capacitance of a multilayer ceramic capacitor obtained under the condition of applying at 20° C. a voltage of 1.0 V (root mean square value) with a frequency of 1 kHz.

(B) Dielectric loss tan$\delta$ (%) was obtained under the same condition as established for measuring the permittivity cited above.

(C) resistivity ($\Omega$cm) was acquired by measuring a resistance between a pair of external electrodes after DC 25 V was applied for 60 seconds at 20° C. The number following "E" in the notation of a resistivity value presented in the accompanying Tables 2-1 to 2-6 represents an order. For instance, 4.8 E+12 represents $4.8 \times 10^{12}$.

(D) Accelerated life (second) was obtained by measuring time period until an insulation resistivity ($\rho$) becomes $1 \times 10^{10}$ $\Omega$cm in a DC electric field of 20 V/$\mu$m at 150° C.

(E) Capacitance variation $\Delta C/C_{25}$ (%) was obtained by measuring capacitances at −55° C., +25° C. and +125° C. in a thermostatic (or constant temperature) oven under the condition of applying a voltage of 1 V (rms value) with a frequency of 1 kHz, wherein $C_{25}$ represents a capacitance at 25° C. and $\Delta C$ represents the difference between $C_{25}$ and a capacitance measured at −55° C. or 125° C.

TABLE 2-1

| Sample Number | Sintering Temperature (° C.) | Permittivity | Tan δ (%) | Resistivity (Ω cm) at Room Temperature | Capacitance Variation ΔC/C$_{25}$ (%) −55° C. | 125° C. | Accelerated Life (sec) |
|---|---|---|---|---|---|---|---|
| 1-X | 1300 | 3400 | 3.3 | 4.8E+12 | −12.0 | −14.5 | 140,400 |
| 2-X | 1300 | 3320 | 3.4 | 9.8E+12 | −13.4 | −13.9 | 162,000 |
| 3-X | 1300 | 3680 | 3.6 | 3.1E+12 | −12.5 | −14.4 | 86,400 |
| 4 | 1300 | 3350 | 3.1 | 2.2E+12 | −11.2 | −13.8 | 244,800 |
| 5 | 1300 | 3310 | 3.0 | 1.1E+12 | −11.5 | −14.1 | 320,400 |
| 6 | 1300 | 3500 | 3.4 | 1.2E+12 | −12.2 | −14.5 | 235,400 |
| 7 | 1300 | 3440 | 3.3 | 5.5E+12 | −12.1 | −13.8 | 277,200 |
| 8 | 1300 | 3290 | 3.1 | 6.4E+12 | −12.4 | −13.8 | 295,200 |
| 9 | 1300 | 3410 | 3.3 | 7.8E+12 | −12.9 | −13.9 | 248,400 |
| 10 | 1300 | 3380 | 3.1 | 3.1E+12 | −13.3 | −14.1 | 349,200 |
| 11 | 1300 | 3150 | 2.8 | 3.1E+12 | −11.2 | −13.3 | 432,000 |
| 12 | 1300 | 3080 | 2.4 | 9.2E+11 | −11.0 | −14.1 | 560,100 |
| 13 | 1300 | 3190 | 2.5 | 3.6E+12 | −12.0 | −14.4 | 420,400 |
| 14 | 1300 | 3010 | 2.9 | 4.5E+11 | −14.5 | −14.1 | 623,800 |
| 15 | 1300 | 3620 | 3.5 | 2.7E+11 | −14.8 | −15.0 | 220,800 |
| 16 | 1300 | 3100 | 2.9 | 4.3E+12 | −10.9 | −12.4 | 1,080,400 |
| 17 | 1300 | 3030 | 2.4 | 5.5E+12 | −11.3 | −12.9 | 2,875,000 |
| 18 | 1300 | 3280 | 3.0 | 1.2E+12 | −12.3 | −13.5 | 328,900 |
| 19 | 1300 | 3080 | 2.6 | 6.5E+12 | −11.5 | −13.2 | 3,498,900 |
| 20 | 1300 | 3140 | 2.9 | 9.6E+12 | −13.4 | −14.3 | 1,094,900 |
| 21 | 1300 | 3050 | 2.9 | 3.1E+12 | −13.4 | −13.9 | 1,947,600 |
| 22 | 1300 | 3090 | 3.0 | 5.5E+12 | −12.8 | −13.8 | 335,400 |
| 23 | 1300 | 3170 | 3.1 | 2.5E+12 | −10.8 | −12.9 | 298,400 |
| 24 | 1300 | 3010 | 2.5 | 5.9E+12 | −12.7 | −14.8 | 1,048,500 |
| 25-X | 1300 | 2950 | 2.0 | 2.9E+12 | −12.1 | −13.9 | 829,000 |
| 26-X | 1300 | 2610 | 2.9 | 3.9E+11 | −12.6 | −14.5 | 1,253,400 |
| 27-X | 1300 | 2950 | 3.1 | 3.9E+11 | −12.2 | −15.5 | 145,900 |
| 28 | 1300 | 3030 | 2.3 | 3.7E+12 | −11.9 | −14.3 | 2,087,500 |
| 29-X | 1300 | 3250 | 3.0 | 4.0E+12 | −13.3 | −14.1 | 179,000 |

TABLE 2-2

| Sample Number | Sintering Temperature (° C.) | Permittivity | Tan δ (%) | Resistivity (Ω cm) at Room Temperature | Capacitance Variation ΔC/C$_{25}$ (%) -55° C. | 125° C. | Accelerated Life (sec) |
|---|---|---|---|---|---|---|---|
| 30 | 1300 | 3310 | 3.1 | 3.5E+12 | −13.9 | −13.3 | 353,900 |
| 31 | 1300 | 3420 | 3.2 | 5.9E+11 | −14.1 | −13.3 | 819,400 |
| 32 | 1300 | 3140 | 3.4 | 2.2E+11 | −13.9 | −13.4 | 1,043,500 |
| 33 | 1300 | 3520 | 3.5 | 1.0E+11 | −13.2 | −12.8 | 1,567,800 |
| 34✕ | 1300 | 3740 | 5.2 | 3.1E+10 | −17.2 | −8.2 | 3,255,800 |
| 35 | 1300 | 3390 | 3.0 | 5.5E+12 | −13.9 | −14.3 | 810,400 |
| 36✕ | 1300 | 3980 | 4.4 | 9.2E+11 | −13.9 | −17.1 | 18,000 |
| 37 | 1300 | 3470 | 3.5 | 3.2E+12 | −14.4 | −14.5 | 221,600 |
| 38 | 1300 | 3320 | 3.3 | 3.9E+12 | −13.3 | −14.4 | 498,700 |
| 39 | 1300 | 3190 | 2.9 | 6.4E+12 | −14.1 | −14.5 | 925,800 |
| 40 | 1300 | 3040 | 2.8 | 2.2E+12 | −14.9 | −14.4 | 1,245,300 |
| 41✕ | 1300 | Incapable of obtaining a sintered ceramic with high density | | | | | |
| 42✕ | 1300 | incapable of obtaining a sintered ceramic with high density | | | | | |
| 43 | 1300 | 3590 | 3.5 | 2.9E+11 | −14.5 | −14.9 | 210,900 |
| 44 | 1300 | 3310 | 3.5 | 3.1E+11 | −14.4 | −15.0 | 348,000 |
| 45 | 1300 | 3190 | 3.2 | 8.1E+12 | −13.3 | −14.8 | 287,100 |
| 46 | 1300 | 3350 | 3.3 | 3.0E+12 | −14.1 | −14.8 | 453,900 |
| 47 | 1300 | 3300 | 3.4 | 3.2E+12 | −14.1 | −14.7 | 558,900 |
| 48 | 1300 | 3410 | 3.5 | 6.1E+12 | −14.4 | −14.9 | 923,400 |
| 49 | 1300 | 3090 | 2.8 | 8.2E+12 | −13.7 | −13.9 | 498,900 |
| 50 | 1300 | 3090 | 2.8 | 7.9E+12 | −14.1 | −13.8 | 348,500 |
| 51 | 1300 | 3110 | 2.6 | 3.5E+12 | −14.4 | −14.1 | 298,100 |
| 52 | 1300 | 3030 | 2.6 | 3.2E+12 | −13.9 | −14.2 | 340,400 |
| 53 | 1300 | 3350 | 3.2 | 4.1E+12 | −14.4 | −14.4 | 498,200 |
| 54 | 1300 | 3410 | 3.3 | 3.0E+12 | −13.9 | −14.1 | 598,100 |
| 55 | 1300 | 3320 | 3.3 | 2.1E+12 | −14.4 | −14.9 | 440,400 |
| 56 | 1300 | 3510 | 3.4 | 8.1E+12 | −13.9 | −14.9 | 784,300 |
| 57 | 1300 | 3280 | 3.3 | 3.9E+12 | −13.4 | −14.9 | 340,000 |
| 58✕ | 1300 | 7590 | 8.8 | 4.1E+14 | −45.2 | 12.4 | 285,600 |

TABLE 2-3

| Sample Number | Sintering Temperature (° C.) | Permittivity | Tan δ (%) | Resistivity (Ω cm) at Room Temperature | Capacitance Variation ΔC/C$_{25}$ (%) -55° C. | 125° C. | Accelerated Life (sec) |
|---|---|---|---|---|---|---|---|
| 59 | 1300 | 3590 | 3.5 | 3.2E+12 | −14.9 | −13.2 | 697,200 |
| 60 | 1300 | 3020 | 3.0 | 3.9E+12 | −13.0 | −15.0 | 298,500 |
| 61✕ | 1300 | 2950 | 2.2 | 2.1E+13 | −13.1 | −17.2 | 123,000 |
| 62✕ | 1300 | 3690 | 4.2 | 4.4E+13 | 13.3 | −15.0 | 12,000 |
| 63 | 1300 | 3370 | 3.3 | 9.1E+12 | −13.9 | −14.4 | 492,100 |
| 64 | 1300 | 3080 | 3.0 | 3.0E+13 | −12.3 | −14.1 | 318,000 |
| 65 | 1300 | 3010 | 2.5 | 3.1E+13 | −13.0 | −13.9 | 259,100 |
| 66✕ | 1300 | 2790 | 2.0 | 4.9E+13 | −13.3 | −14.4 | 2,300 |
| 67✕ | 1300 | Incapable of obtaining a sintered ceramic with high density | | | | | |
| 68 | 1300 | 3400 | 3.5 | 2.1E+12 | −14.1 | −14.5 | 567,800 |
| 69 | 1280 | 3290 | 2.5 | 3.6E+13 | −12.5 | −14.4 | 439,000 |
| 70 | 1280 | 3060 | 3.0 | 3.5E+13 | −13.4 | −13.2 | 650,900 |
| 71✕ | 1280 | 2480 | 2.4 | 5.0E+13 | −13.5 | −14.1 | 4,500 |
| 72✕ | 1300 | Incapable of obtaining a sintered ceramic with high density | | | | | |
| 73 | 1300 | 3290 | 3.4 | 4.4E+13 | −14.4 | 13.9 | 875,600 |
| 74 | 1300 | 3350 | 3.5 | 5.3E+13 | −13.5 | −13.4 | 764,900 |
| 75✕ | 1300 | — | — | 3.5E+13 | — | — | |
| 76 | 1300 | 3180 | 3.3 | 5.3E+13 | −14.4 | −13.3 | 485,900 |
| 77 | 1300 | 3080 | 3.2 | 5.9E+13 | −13.1 | −13.5 | 354,800 |
| 78 | 1300 | 3430 | 3.3 | 8.2E+13 | −12.8 | −15.0 | 298,700 |
| 79✕ | 1300 | Incapable of obtaining a sintered ceramic with high density | | | | | |
| 80 | 1300 | 3200 | 3.5 | 3.5E+13 | −14.5 | −14.8 | 498,500 |
| 81 | 1300 | 3420 | 3.3 | 7.1E+13 | −14.6 | −15.0 | 429,800 |
| 82✕ | 1300 | Incapable of obtaining a sintered ceramic with high density | | | | | |
| 83 | 1300 | 3310 | 3.5 | 5.7E+13 | −13.8 | −14.3 | 656,700 |

TABLE 2-4

| Sample Number | Sintering Temperature (° C.) | Permittivity | Tan δ (%) | Resistivity (Ω cm) at Room Temperature | Capacitance Variation ΔC/C$_{25}$ (%) | | Accelerated Life (sec) |
|---|---|---|---|---|---|---|---|
| | | | | | −55° C. | 125° C. | |
| 84·X· | 1300 | 3002 | 3.25 | 1.46E+12 | −11.4 | −11.5 | 29,500 |
| 85·X· | 1300 | 3613 | 2.96 | 4.88E+10 | −14.7 | −12.1 | 19,700 |
| 86·X· | 1300 | 3669 | 2.89 | 1.49E+12 | −11.9 | −13.4 | 138,300 |
| 87 | 1300 | 3300 | 2.59 | 9.28E+11 | −14.8 | −13.7 | 257,100 |
| 88 | 1300 | 3281 | 2.86 | 1.92E+12 | −11.2 | −11.6 | 480,200 |
| 89 | 1300 | 3707 | 2.50 | 1.99E+12 | −14.9 | −12.1 | 343,300 |
| 90 | 1300 | 3653 | 3.01 | 1.73E+12 | −12.3 | −14.6 | 337,400 |
| 91 | 1300 | 3355 | 2.75 | 8.04E+11 | −11.1 | −13.7 | 207,800 |
| 92 | 1300 | 3636 | 3.19 | 1.18E+12 | −13.8 | −13.6 | 306,600 |
| 93 | 1300 | 3013 | 3.20 | 1.96E+12 | −12.8 | −12.4 | 351,000 |
| 94 | 1300 | 3540 | 2.72 | 5.21E+11 | −12.0 | −12.2 | 300,900 |
| 95 | 1300 | 3141 | 2.63 | 1.94E+12 | −11.3 | −13.4 | 429,200 |
| 96 | 1300 | 3084 | 3.29 | 5.23E+11 | −14.1 | −12.3 | 213,200 |
| 97 | 1300 | 3402 | 2.55 | 8.61E+11 | −13.1 | −14.6 | 449,900 |
| 98 | 1300 | 3522 | 2.74 | 1.64E+12 | −13.5 | −12.4 | 263,300 |
| 99 | 1300 | 3547 | 3.28 | 6.36E+11 | −13.5 | −14.5 | 406,700 |
| 100 | 1300 | 3611 | 2.92 | 5.97E+11 | −13.1 | −14.9 | 401,800 |
| 101 | 1300 | 3105 | 3.32 | 6.00E+11 | −13.6 | −13.3 | 351,400 |
| 102 | 1300 | 3422 | 3.08 | 1.54E+12 | −12.6 | −13.6 | 206,800 |
| 103 | 1300 | 3037 | 2.78 | 1.09E+12 | −12.1 | −11.2 | 479,700 |
| 104 | 1300 | 3753 | 3.19 | 9.37E+11 | −14.0 | −11.7 | 475,400 |
| 105 | 1300 | 3214 | 3.20 | 4.03E+11 | −14.8 | −14.7 | 404,800 |
| 106 | 1300 | 3555 | 3.13 | 1.41E+12 | −14.8 | −11.3 | 228,500 |
| 107 | 1300 | 3269 | 2.56 | 1.18E+12 | −14.4 | −14.1 | 279,400 |
| 108·X· | 1300 | 2386 | 2.95 | 1.29E+11 | −14.7 | −14.4 | 320,500 |
| 109·X· | 1300 | 2865 | 2.72 | 2.11E+11 | −13.1 | −12.6 | 496,700 |
| 110·X· | 1300 | 2187 | 2.76 | 1.53E+12 | −14.2 | −13.1 | 167,500 |

TABLE 2-5

| Sample Number | Sintering Temperature (° C.) | Permittivity | Tan δ (%) | Resistivity (Ω cm) at Room Temperature | Capacitance Variation ΔC/C$_{25}$ (%) | | Accelerated Life (sec) |
|---|---|---|---|---|---|---|---|
| | | | | | −55° C. | 125° C. | |
| 111·X· | 1300 | Incapable of obtaining a sintered ceramic with high density | | | | | |
| 112 | 1300 | 3490 | 3.5 | 4.3E+12 | −14.5 | −14.8 | 875,100 |
| 113 | 1300 | 3120 | 2.9 | 2.7E+13 | −14.1 | −14.6 | 547,800 |
| 114 | 1300 | 3010 | 2.3 | 1.5E+13 | −13.4 | −12.8 | 564,000 |
| 115·X· | 1300 | 2690 | 2.8 | 5.3E+13 | −13.5 | −14.6 | 5,600 |
| 116·X· | 1300 | 3420 | 3.1 | 5.5E+12 | −13.4 | −15.6 | 153,800 |
| 117 | 1300 | 3330 | 3.1 | 3.5E+12 | −13.9 | −13.3 | 224,900 |
| 118 | 1300 | 3410 | 3.3 | 2.8E+12 | −14.1 | −13.3 | 332,700 |
| 119 | 1300 | 3410 | 3.4 | 3.9E+11 | −13.1 | −13.9 | 983,400 |
| 120 | 1300 | 3470 | 3.3 | 1.2E+11 | −13.2 | −12.8 | 1,173,800 |
| 121 | 1300 | 3520 | 3.3 | 1.4E+11 | −14.6 | −11.7 | 2,138,000 |
| 122·X· | 1300 | 3730 | 4.3 | 4.7E+10 | −17.2 | −9.6 | 3,278,000 |
| 123·X· | 1300 | 3250 | 3.0 | 4.0E+12 | −13.3 | −14.1 | 179,000 |
| 124 | 1300 | 3320 | 3.1 | 5.8E+12 | −13.5 | −14.2 | 237,000 |
| 125 | 1300 | 3350 | 3.2 | 8.2E+12 | −13.8 | −13.8 | 279,000 |
| 126 | 1300 | 3410 | 3.3 | 2.8E+12 | −14.1 | −13.3 | 332,700 |
| 127 | 1300 | 3450 | 3.3 | 1.8E+12 | −14.0 | −13.4 | 402,500 |
| 128 | 1300 | 3500 | 3.4 | 9.9E+11 | −13.9 | −13.2 | 869,800 |
| 129 | 1300 | 3540 | 3.5 | 7.6E+11 | −13.5 | −13.1 | 1,115,800 |
| 130 | 1300 | 3610 | 3.5 | 8.7E+10 | −13.3 | −12.6 | 1,408,900 |
| 131·X· | 1300 | 3840 | 6.2 | 5.4E+10 | −18.0 | −7.3 | 3,384,600 |
| 132 | 1300 | 3100 | 2.9 | 4.6E+12 | −13.2 | −14.3 | 132,000 |
| 133 | 1300 | 3110 | 3.1 | 5.3E+12 | −13.4 | −14.4 | 242,000 |
| 134 | 1300 | 3350 | 3.2 | 5.6E+12 | −13.6 | −14.2 | 530,000 |
| 135 | 1300 | 3420 | 3.4 | 5.6E+12 | −13.9 | −13.8 | 889,000 |
| 136 | 1300 | 3550 | 3.5 | 5.6E+12 | −13.9 | −13.2 | 1,086,000 |
| 137·X· | 1300 | 3680 | 4.7 | 5.6E+12 | −14.9 | −10.5 | 2,532,000 |

TABLE 2-6

| Sample Number | Sintering Temperature (° C.) | Permittivity | Tan δ (%) | Resistivity (Ω cm) at Room Temperature | Capacitance Variation ΔC/C$_{25}$ (%) −55° C. | 125° C. | Accelerated Life (sec) |
|---|---|---|---|---|---|---|---|
| 138·X | 1300 | Incapable of obtaining a sintered ceramic with high density | | | | | |
| 139 | 1300 | 3314 | 2.82 | 7.36E+11 | −11.3 | −11.0 | 319,400 |
| 140 | 1300 | 3678 | 3.17 | 1.20E+12 | −14.3 | −12.8 | 469,100 |
| 141 | 1300 | 3452 | 2.82 | 6.61E+11 | −14.3 | −11.2 | 425,300 |
| 142·X | 1300 | Incapable of obtaining a sintered ceramic with high density | | | | | |
| 143·X | 1300 | 2843 | 2.87 | 8.17E+11 | −14.4 | −12.8 | 30,900 |
| 144 | 1300 | 3387 | 2.54 | 1.16E+12 | −12.8 | −14.0 | 377,900 |
| 145 | 1300 | 3720 | 3.31 | 1.80E+12 | −11.4 | −14.3 | 309,200 |
| 146·X | 1300 | 3527 | 3.36 | 8.10E+11 | −11.1 | −11.9 | 376,500 |
| 147 | 1300 | 3706 | 3.18 | 7.88E+10 | −12.4 | −12.8 | 470,600 |
| 148 | 1300 | 3671 | 3.29 | 5.91E+11 | −11.8 | −14.2 | 433,700 |
| 149 | 1300 | 3338 | 2.75 | 3.06E+11 | −13.5 | −13.6 | 224,900 |
| 150·X | 1300 | Incapable of obtaining a sintered ceramic with high density | | | | | |
| 151 | 1300 | 3161 | 3.16 | 7.62E+11 | −12.8 | −11.4 | 471,800 |
| 152 | 1300 | 3765 | 2.89 | 1.57E+12 | −11.9 | −12.3 | 299,600 |
| 153·X | 1300 | Incapable of obtaining a sintered ceramic with high density | | | | | |
| 154 | 1300 | 3786 | 2.73 | 4.64E+11 | −14.4 | −13.1 | 330,200 |

As clearly seen from Tables 1-1 to 1-6 and Tables 2-1 to 2-6, multilayer ceramic capacitors with highly improved reliability having relative permittivity $\epsilon_s$ equal to or greater than 3000, capacitance variation $\Delta C/C_{25}$ within the range from −15% to +15% at temperatures ranging from −55° C. to +125° C., tan δ of 3.5% or less and accelerated life of 200,000 seconds or greater could be obtained from the above samples sintered in a non-oxidative atmosphere even at a temperature of 1300° C. or lower in accordance with the present invention.

However, samples 1 to 3, 25 to 27, 29, 34, 36, 41, 42 58, 61, 62, 66, 67, 71, 72, 75, 79, 82, 84, 85, 86, 108 to 111, 115, 116, 122, 123, 131, 137, 138, 142, 143, 146, 150, and 153 (marked with "·X·" at the column of sample numbers in Tables) could not satisfy the above-specified electrical characteristics. Therefore, it appears that such samples fall outside a preferable compositional range of the present invention.

The reasons why the preferable compositional range for the dielectric ceramics in accordance with the present invention should be limited to certain values will now be described. In Tables 1-1 to 1-6, the amount of oxides of Ba and Ti was 100 mol % in terms of BaTiO$_3$ (i.e., assuming Ba and Ti are in the form of BaTiO$_3$).

First, when the content of an oxide of a rare-earth element represented by Re (Re is selected, e.g., from the group consisting of Sm, Eu, Gd, Tb, Dy, Ho, Er, Tm, Yb and Y) is 0 mol % in terms of Re$_2$O$_3$ (i.e., assuming the oxide of Re is in the form of Re$_2$O$_3$) as in the sample 36, the capacitance variation $\Delta C/C_{25}$ of a produced multilayer ceramic capacitor goes beyond the range from −15% to +15% when temperature varies from −55° C. to +125° C. or a desired accelerated life may not be attained; whereas when the oxide of Re is set to be 0.25 mol % in terms of Re$_2$O$_3$ as in sample 37, the desired electrical characteristics can be successfully obtained.

Further, when the content of the oxide of the rare-earth element Re is equal to or greater than 2.0 mol % in terms of Re$_2$O$_3$ as in the samples 41 and 42, highly densified ceramic bodies may not be obtained by the sintering at 1300° C.; whereas when the oxide of the rare-earth element Re is set to be 1.5 mol % in terms of Re$_2$O$_3$ as in sample 40, the desired electrical characteristics can be successfully obtained.

Accordingly, the preferable range of the content of oxide of the rare-earth element Re is from 0.25 to 1.5 mol % in terms of Re$_2$O$_3$.

It is noted that same effects can be produced regardless of whether a single rare-earth element is used as in samples 43 to 53, or two or more of rare-earth elements are used together as in samples 54 to 57 as long as the above-described preferable content range of the rare-earth element Re is satisfied.

When the content of an oxide of Mg is 0 mol % in terms of MgO as in the sample 58, the capacitance variation $\Delta C/C_{25}$ of a produced multilayer ceramic capacitor may exceed the range from −15% to +15% when the temperature varies from −55° C. to +125° C., or tanδ may be deteriorated over 3.5%; whereas when the content of the oxide of Mg is be 0.2 mol % in terms of MgO as in sample 59, the desired electrical characteristics can be successfully obtained.

In addition, when the content of the oxide of Mg is 2.0 mol % in terms of MgO as in the sample 61, the relative permittivity of the produced multilayer ceramic capacitors may become equal to or less than 3000 and the desired accelerated life cannot be obtained. However, when the content of the oxide of Mg is set to be 1.5 mol % in terms of MgO as in sample 60, the desired electrical characteristics can be successfully obtained.

Accordingly, the content of the oxide of Mg desirably ranges from 0.2 to 1.5 mol % in terms of MgO.

When the content of an oxide of each element Mn, V or Cr is 0.02 mol % in terms of Mn$_2$O$_3$, V$_2$O$_5$ or Cr$_2$O$_3$, as in the samples 1 to 3, the desired accelerated life of the produced multilayer ceramic capacitors may not be obtained; whereas when the total content of the oxides of Mn, V and Cr is set to be 0.03 mol % in terms of Mn$_2$O$_3$, V$_2$O$_5$ and Cr$_2$O$_3$, as in the samples 4 to 6, the desired characteristics can be successfully attained.

Further, when the content of an oxide of Mn, V or Cr is 0.7 mol % in terms of Mn$_2$O$_3$, V$_2$O$_5$ or Cr$_2$O$_3$, as in the samples 25 to 27, the relative permittivity of the capacitors becomes equal to or less than 3000. However, when the content of sum of the oxides of Mn, V and Cr is set to be 0.6 mol % in terms of Mn$_2$O$_3$, V$_2$O$_5$ and Cr$_2$O$_3$, as in samples 22 to 24, the desired characteristics can be successfully attained.

Accordingly, it is preferable that the total amount of oxides of Mn, V and Cr ranges from 0.03 to 0.6 mol % in terms of $Mn_2O_3$, $V_2O_5$ and $Cr_2O_3$.

Further, it is to be noted that same effects can be obtained regardless of whether an oxide of one of the elements Mn, V and Cr is used along as in samples 4 to 6 and 13 to 18, or two or more thereof are used together as in samples 7 to 12 and 19 to 24 as long as the total content thereof satisfies the above specified range.

When the total content of oxides of Mo and W is 0 mol % in terms of $MoO_3$ and $WO_3$, as in the samples 29, 116 and 123, the desired accelerated life of the produced multilayer ceramic capacitors cannot be obtained. However, if the total content of oxides of Mo and W is set to be 0.025 mol % in terms of $MoO_3$ and $WO_3$, respectively, as in samples 30, 117 and 124, the desired characteristics can be successfully attained.

Further, when the content of oxides of Mo and W is greater than 0.25 mol % in terms of $MoO_3$ and $WO_3$, as in the samples 34, 122 and 137, the desired accelerated life may not be obtained or the capacitance variation $\Delta C/C_{25}$ exceeds the range from −15 to +15% with the temperature varying from −55° C. to +125° C., or the tanδ may be deteriorated over 3.5. However, when the total content of oxides is set to be 0.25 mol %, as in samples 130 and 136, the desired electrical characteristics can be successfully obtained.

Accordingly, it is preferable that the total content of the oxides of Mo and W ranges from 0.025 to 0.25 mol % in terms of $MoO_3$ and $WO_3$.

Furthermore, same effects can be obtained regardless of whether the oxides of Mo and W are used separately as in samples 30 to 33 and 117 to 121, or used together as in samples 124 to 130 and 132 to 136.

The optimum range of the glass component varies depending on the constituents thereof.

First, in case the glass component is substantially formed of $SiO_2$ only, the optimum content of the glass component is as follows:

When the content of $SiO_2$ is 0.00 mol % as in sample 111, a highly densified ceramic body may not be obtained by the sintering process at 1300° C.; whereas when the content of $SiO_2$ is set to be 0.2 mol % as in sample 112, the desired electrical characteristics can be successfully obtained.

Further, when the content of $SiO_2$ is 5.0 mol % as in sample 115, the desired accelerated life may not be obtained; whereas when the content of $SiO_2$ is set to be 4.0 mol % as in sample 114, the desired electrical characteristics can be obtained.

Accordingly the content of the glass component mainly formed of $SiO_2$ preferably ranges from 0.20 mol % and 4 mol %.

In case the glass component including $SiO_2$ is composed of $Li_2O$—$BaO$—$TiO_2$—$SiO_2$, the optimum range of the content of $Li_2O$—$BaO$—$TiO_2$—$SiO_2$ preferably is determined as follows:

When the total content of glass component $Li_2O$—$BaO$—$TiO_2$—$SiO_2$ is 0 mol % as in the sample 62, tanδ of the produced capacitor may be deteriorated over 3.5% or the desired accelerated life may not be obtained; whereas when the content of the glass component $Li_2O$—$BaO$—$TiO_2$—$SiO_2$ is 0.05 mol % as in sample 63, the desired electrical characteristics can be successfully attained.

Further, when the content of the glass component $Li_2O$—$BaO$—$TiO_2$—$SiO_2$ is 2.0 mol % as in the sample 66, the relative permittivity of the produced multilayer ceramic capacitor may fall below 3000 or the desired accelerated life may not be attained; whereas when the content of the glass component $Li_2O$—$BaO$—$TiO_2$—$SiO_2$ is 1.0 mol % as in the sample 65, the desired electrical characteristics can be obtained.

Accordingly, the total content of the glass component $Li_2O$—$BaO$—$TiO_2$—$SiO_2$ is preferably between 0.05 and 1.0 wt % inclusive.

Figure 2:
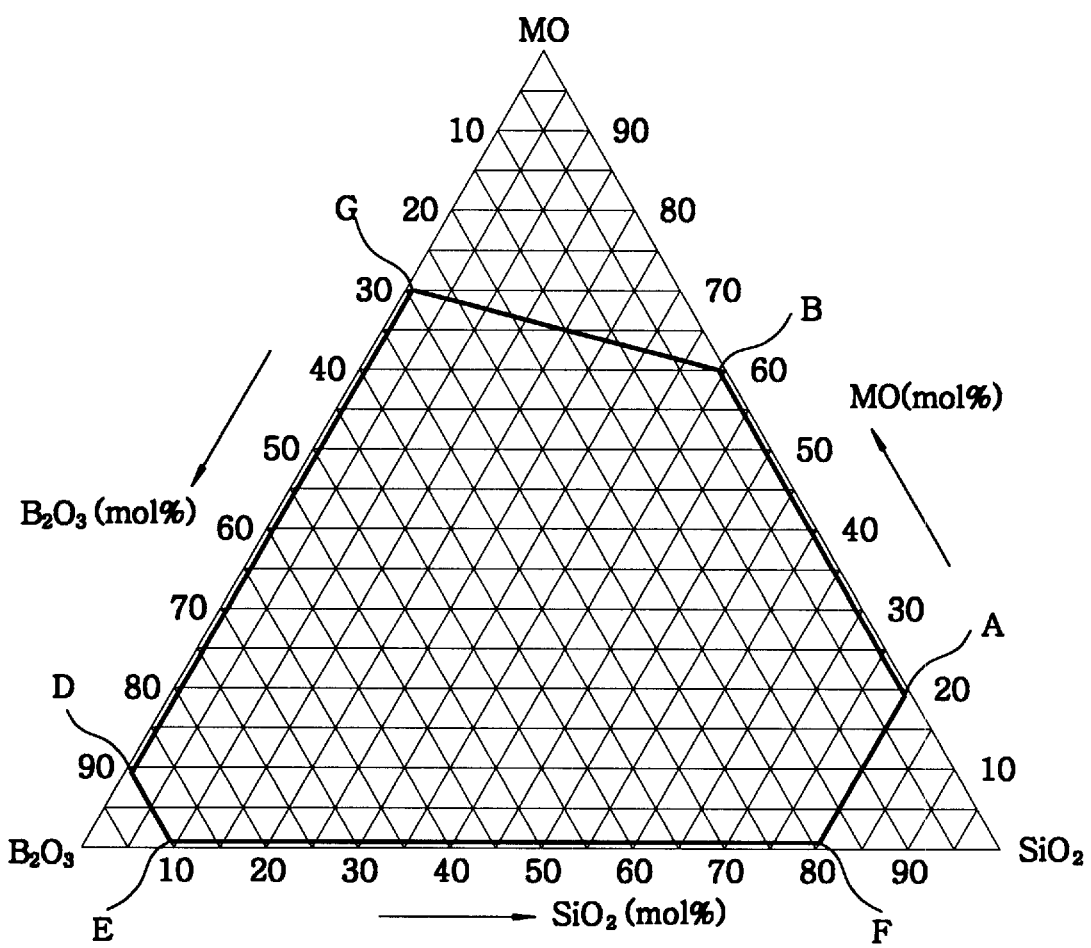
FIG. 2 is a triangular composition diagram for showing compositions of $B_2O_3$—$SiO_2$-MO in a unit of mol %.

In case the glass component including $SiO_2$ is composed of $B_2O_3$—$SiO_2$-MO (MO used herein represents one or more oxides selected from the group of BaO, SrO, CaO, MgO and ZnO), the preferable composition of $B_2O_3$—$SiO_2$-MO for obtaining desired electrical characteristics is within the range surrounded by 6 lines formed by cyclically connecting 6 points A, B, C, D, E and F in that order shown in a triangular composition diagram of FIG. 2, wherein the triangular composition diagram exhibits a composition of $B_2O_3$—$SiO_2$-MO in terms of their mol %. The first point A represents a composition containing 1 mol % of $B_2O_3$, 80 mol % of $SiO_2$ and 19 mol % of MO, a second point B represents a composition including 1 mol % of $B_2O_3$, 39 mol % of $SiO_2$ and 60 mol % of MO. The third point C represents a composition containing 29 mol % of $B_2O_3$, 1 mol % of $SiO_2$ and 70 mol % of MO. The fourth point D represents a composition containing 90 mol % of $B_2O_3$, 1 mol % of $SiO_2$ and 9 mol % of MO. The fifth point E represents a composition containing 90 mol % of $B_2O_3$, 9 mol % of $SiO_2$ and 1 mol % of MO and the sixth point F represents a composition containing 19 mol % of $B_2O_3$, 80 mol % of $SiO_2$ and 1 mol % of MO. If a $B_2O_3$—$SiO_2$-Mo composition is within the range defined with 6 points described above as in samples 73, 74, 76 to 78, 80, 81 and 83, the desired electrical characteristics can be obtained. However, if the composition is out of the range not as in the samples 72, 75, 79 and 82, a highly densified ceramic body may not be attained at 1300° C.

Further, when the content of $B_2O_3$—$SiO_2$-MO is 0 wt % as in the sample 67, a highly densified ceramic body may not be obtained when sintered at 1300° C.; whereas when the content of $B_2O_3$—$SiO_2$-Mo is 0.05 wt % as in sample 68, the desired electrical characteristics can be successfully attained.

Still further, when the content of $B_2O_3$—$SiO_2$-Mo is 10.00 wt % as in the sample 71, the relative permittivity may become less than 3000 or the desired accelerated life may not be obtained; whereas when the content of $B_2O_3$—$SiO_2$-Mo is set to be 5.00 wt % as in sample 70, the desired electrical characteristics can be obtained.

Accordingly, the content of $B_2O_3$—$SiO_2$-Mo preferably ranges from 0.05 to 5.0 wt %.

Figure 3:
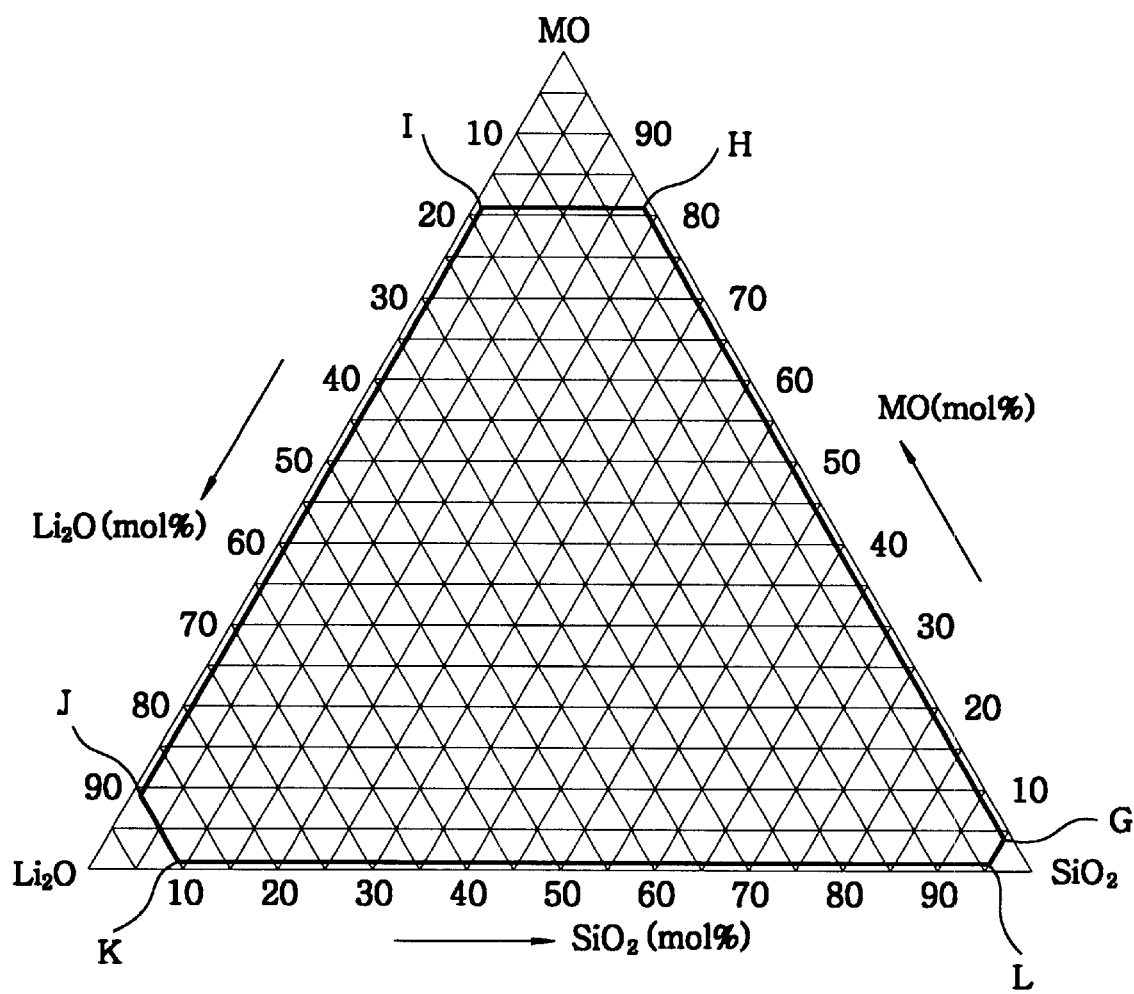
FIG. 3 sets forth a triangular composition diagram for illustrating compositions of $LiO_2$—$SiO_2$-MO in a unit of mol %.

When the glass component including $SiO_2$ is composed of $Li_2O$—$SiO_2$-MO (Mo used herein represents one or more oxides selected from the group consisting of BaO, SrO, CaO, MgO and ZnO), the preferable compositional range for $Li_2O$—$SiO_2$-MO is within the range surrounded by 6 lines formed by cyclically connecting 6 points G, H, I, J, K and L in that order as shown in a triangular composition diagram of FIG. 3, wherein the triangular diagram shows a compositional of $Li_2O$—$SiO_2$-MO in a unit of mol %. The seventh point G represents a composition containing 1 mol % of $Li_2O$, 94 mol % of $SiO_2$ and 5 mol % of MO. The eighth point H represents a composition containing 1 mol % of $Li_2O$, 79 mol % of $SiO_2$ and 20 mol % of MO. The ninth point I represents a composition containing 19 mol % of $Li_2O$, 1 mol % of $SiO_2$ and 80 mol % of MO. The tenth point J represents a composition containing 89 mol % of Li₂O, 1 mol % of SiO₂ and 10 mol % of MO. The eleventh point K represents a composition containing 90 mol % of Li₂O₃, 9 mol % of SiO₂ and 1 mol % of MO and the twelfth point L represents a composition containing 5 mol % of Li₂O, 94 mol % of SiO₂ and 1 mol % of MO. If a Li₂O—SiO₂-Mo composition falls within the range defined by the 6 G–L, as in samples 144, 145, 147 to 149, 151, 152 and 154, the desired electrical characteristics can be obtained, but if otherwise as in samples 143, 146, 150 and 153, a highly densified ceramic body with a highly improved density may not be attained after being sintered at 1300° C.

Further, when the content of Li₂O—SiO₂-MO is 0 wt % as in the sample 138, a highly densified ceramic body may not be obtained by the sintering process at 1300° C.; whereas when the content of Li₂O—SiO₂-MO is set as 0.05 wt % as in sample 139, the desired electrical characteristics can be acquired.

Still further, when the content of Li₂O—SiO₂-MO is 10.00 wt % as in the sample 142, a highly densified ceramic body may not be gained by the sintering at 1300° C.; whereas when the content of Li₂O—SiO₂-MO is set to be 5.00 wt % as in sample 141, the desired electrical characteristics can be successfully obtained.

Accordingly, the content of Li₂O—SiO₂-MO optimally ranges from 0.05 to 5.0 wt %.

Further, when the total content of oxides of Fe, Ni and Cu and oxides of Mn, V and Cr is 0.03 mol % in terms of FeO, NiO, CuO, Mn₂O₃, V₂O₅ and Cr₂O₃ as in the samples 84 to 86, the desired accelerated life may not be obtained; whereas when the total content thereof is 0.04 mol % as in samples 87 to 89, the desired electrical characteristics can be successfully obtained.

Further, when the total content of oxides of Fe, Ni and Cu and oxides of Mn, V and Cr is 1.3 mol % in terms of FeO, NiO, CuO, Mn₂O₃, V₂O₅ and Cr₂O₃, as in the samples 108 to 110, the relative permittivity of produced multilayer ceramic capacitors may go below 3000 or the desired accelerated life may not be attained; whereas when the total content is 1.00 mol % as in samples 105 to 107, the desired electrical characteristics can be successfully obtained.

Accordingly, the total amount of the oxides of Fe, Ni and Cu and the oxides of Mn, V and Cr preferably range from 0.04 to 1.00 mol %.

It should be noted that other types of raw materials can be employed as source materials for obtaining the ceramic slurry. For instance, barium acetate or barium nitrate can be used instead of BaCO₃.

Although the present invention has been described with reference to the multilayer ceramic capacitors only, it should be apparent to those skilled in the art that the present invention can also be applied to single-layer ceramic capacitors.

The present invention can produce a multilayer ceramic capacitor capable of providing a desired accelerated life with a highly improved reliability, wherein the capacitor exhibits a relative permittivity $\epsilon_s$ of 3000 or greater, tan$\delta$ of 3.5% or less and a capacitance variation $\Delta C/C_{25}$ ranging from −15% to +15% with the temperature variances from −55° C. to +125° C.

While the invention has been shown and described with respect to the preferred embodiments, it will be understood by those skilled in the art that various changes and modifications may be made without departing from the spirit and scope of the invention as defined in the following claims.

What is claimed is:

1. A dielectric ceramic composition comprising:
   100 mol % of an oxide of Ba and Ti;
   0.25 to 1.5 mol % of an oxide of Re, Re representing one or more elements selected from the group consisting of Sm, Eu, Gd, Tb, Dy, Ho, Er, Tm, Yb and Y;
   0.2 to 1.5 mol % of an oxide of Mg;
   0.03 to 0.6 mol % of oxides of one or more elements selected from the group consisting of Mn, V and Cr;
   0.025 to 0.25 mol % of oxides of one or two elements of Mo and W; and
   a glass component including SiO₂.

2. The dielectric ceramic composition of claim 1, wherein a content of the oxide of Ba and Ti is calculated by assuming that the oxide of Ba and Ti is BaTiO₃; a content of the oxide of Re is calculated by assuming that the oxide of Re is Re₂O₃; a content of the oxide of Mg is calculated by assuming that the oxide of Mg is MgO; a content of oxides of Mn, V and Cr is calculated by assuming that the oxides of Mn, V and Cr are Mn₂O₃, V₂O₅ and Cr₂O₃, respectively; and a content of oxides of Mo and W is calculated by assuming that the oxides of Mo and W are MoO₃ and WO₃, respectively.

3. The dielectric ceramic composition of claim 2, further comprising one or more oxides selected from the group consisting of oxides of Fe, Ni and Cu and wherein a total content of oxides of Fe, Ni, Cu, Mn, V and Cr is 0.04 to 1.0 mol %, the total content being calculated by assuming that the oxides of Fe, Ni, Cu, Mn, V and Cr are FeO, NiO, CuO, Mn₂O₃, V₂O₅ and Cr₂O₃, respectively.

4. The dielectric ceramic composition of claim 1, wherein the glass component is composed of Li₂O—BaO—TiO₂—SiO₂ and the content thereof ranges from 0.05 to 1.0 wt %.

5. The ceramic composition of claim 1, wherein the glass component is composed of B₂O₃—SiO₂-MO, MO representing one or more oxides selected from the group consisting of BaO, SrO, CaO, MgO and ZnO, and wherein a composition of B₂O₃—SiO₂-MO is within a range surrounded by 6 lines formed by cyclically connecting 6 points A, B, C, D, E and F in that order in a triangular composition diagram exhibiting compositional amounts of B₂O₃, SiO₂ and Mo in a unit of mol %, and wherein a point A represents a composition including 1 mol % of B₂O₃, 80 mol % of SiO₂ and 19 mol % of MO, a point B represents a composition including 1 mol % of B₂O₃, 39 mol % of SiO₂ and 60 mol % of MO, a point C represents a composition including 29 mol % of B₂O₃, 1 mol % of SiO₂ and 70 mol % of MO, a point D represents a composition including 90 mol % of B₂O₃, 1 mol % of SiO₂ and 9 mol % of MO, a point E represents a composition including 90 mol % of B₂O₃, 9 mol % of SiO₂ and 1 mol % of MO and a point F represents a composition including 19 mol % of B₂O₃, 80 mol % of SiO₂ and 1 mol % of MO, a content of the composition B₂O₃—SiO₂-MO ranging from 0.05 to 5.0 wt %.

6. The ceramic composition of claim 1, wherein the glass component is substantially composed of SiO₂ and a content thereof is 0.20 to 4.0 mol %.

7. The dielectric ceramic composition of claim 1, wherein the glass component is composed of Li₂O—SiO₂-MO, MO representing one or more oxides selected from the group consisting of BaO, SrO, CaO, MgO and ZnO, and wherein the composition of Li₂O—SiO₂-MO is within a range surrounded by 6 lines formed by cyclically connecting 6 points G, H, I, J, K and L in that order in a triangular composition diagram showing compositional amounts of Li₂O, SiO₂ and MO in a unit of mol %, and wherein a point G represents a composition including 1 mol % of $Li_2O$, 94 mol % of $SiO_2$ and 5 mol % of MO, a point H represents a composition including 1 mol % of $Li_2O$, 79 mol % of $SiO_2$ and 20 mol % of MO, a point I represents a composition including 19 mol % of $Li_2O$, 1 mol % of $SiO_2$ and 80 mol % of MO, a point J represents a composition including 89 mol % of $Li_2O$, 1 mol % of $SiO_2$ and 10 mol % of MO, a point K represents a composition including 90 mol % of $Li_2O_3$, 9 mol % of $SiO_2$ and 1 mol % of MO and a point L represents a composition including 5 mol % of $Li_2O$, 94 mol % of $SiO_2$ and 1 mol % of MO, a content of the composition $Li_2O$—$SiO_2$-MO ranging from 0.05 to 5.0 wt %.

8. A ceramic capacitor comprising one or more dielectric layers made of the dielectric ceramic composition of claim 1.

9. The ceramic capacitor of claim 8, wherein the content of the oxide of Ba and Ti is calculated by assuming that the oxide of Ba and Ti is $BaTiO_3$; a content of the oxide of Re is calculated by assuming that the oxide of Re is $Re_2O_3$; a content of the oxide of Mg is calculated by assuming that the oxide of Mg is MgO; a content of oxides of Mn, V and Cr is calculated by assuming that the oxides of Mn, V and Cr are $Mn_2O_3$, $V_2O_5$ and $Cr_2O_3$, respectively; and a content of oxides of Mo and W is calculated by assuming that the oxides of Mo and W are $MoO_3$ and $WO_3$, respectively.

10. The ceramic capacitor of claim 8, wherein the dielectric ceramic composition further comprises one or more oxides selected from the group consisting of oxides of Fe, Ni and Cu and wherein a total content of oxides of Fe, Ni, Cu, Mn, V and Cr is 0.04 to 1.0 mol %, the total content being calculated by assuming that the oxides of Fe, Ni, Cu, Mn, V and Cr are FeO, NiO, CuO, $Mn_2O_3$, $V_2O_5$ and $Cr_2O_3$, respectively.

11. The ceramic capacitor of claim 8, wherein the glass component is composed of $Li_2O$—BaO—$TiO_2$—$SiO_2$ and the content thereof ranges from 0.05 to 1.0 wt %.

12. The ceramic capacitor of claim 8, wherein the glass component is composed of $B_2O_3$—$SiO_2$-MO, MO representing one or more oxides selected from the group consisting of BaO, SrO, CaO, MgO and ZnO, and wherein a composition of $B_2O_3$—$SiO_2$-MO is within a range surrounded by 6 lines formed by cyclically connecting 6 points A, B, C, D, E and F in that order in a triangular composition diagram exhibiting compositional amounts of $B_2O_3$, $SiO_2$ and Mo in a unit of mol %, and wherein a point A represents a composition including 1 mol % of $B_2O_3$, 80 mol % of $SiO_2$ and 19 mol % of MO, a point B represents a composition including 1 mol % of $B_2O_3$, 39 mol % of $SiO_2$ and 60 mol % of MO, a point C represents a composition including 29 mol % of $B_2O_3$, 1 mol % of $SiO_2$ and 70 mol % of MO, a point D represents a composition including 90 mol % of $B_2O_3$, 1 mol % of $SiO_2$ and 9 mol % of MO, a point E represents a composition including 90 mol % of $B_2O_3$, 9 mol % of $SiO_2$ and 1 mol % of MO and a point F represents a composition including 19 mol % of $B_2O_3$, 80 mol % of $SiO_2$ and 1 mol % of MO, a content of the composition $B_2O_3$—$SiO_2$-MO ranging from 0.05 to 5.0 wt %.

13. The ceramic capacitor of claim 8, wherein the glass component is substantially composed of $SiO_2$ and a content thereof is 0.20 to 4.0 mol %.

14. The ceramic capacitor of claim 8, wherein the glass component is composed of $Li_2O$—$SiO_2$-MO, MO representing one or more oxides selected from the group consisting of BaO, SrO, CaO, MgO and ZnO, and wherein the composition of $Li_2O$—$SiO_2$-MO is within a range surrounded by 6 lines formed by cyclically connecting 6 points G, H, I, J, K and L in that order in a triangular composition diagram showing compositional amounts of $Li_2O$, $SiO_2$ and MO in a unit of mol %, and wherein a point G represents a composition including 1 mol % of $Li_2O$, 94 mol % of $SiO_2$ and 5 mol % of MO, a point H represents a composition including 1 mol % of $Li_2O$, 79 mol % of $SiO_2$ and 20 mol % of MO, a point I represents a composition including 19 mol % of $Li_2O$, 1 mol % of $SiO_2$ and 80 mol % of MO, a point J represents a composition including 89 mol % of $Li_2O$, 1 mol % of $SiO_2$ and 10 mol % of MO, a point K represents a composition including 90 mol % of $Li_2O_3$, 9 mol % of $SiO_2$ and 1 mol % of MO and a point L represents a composition including 5 mol % of $Li_2O$, 94 mol % of $SiO_2$ and 1 mol % of MO, a content of the composition $Li_2O$—$SiO_2$-MO ranging from 0.05 to 5.0 wt %.

* * * * *